United States Patent
Antoch

(10) Patent No.: US 7,613,718 B2
(45) Date of Patent: Nov. 3, 2009

(54) MECHANISM FOR EFFICIENTLY IMPLEMENTING OBJECT MODEL ATTRIBUTES

(75) Inventor: Steven T. Antoch, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 10/792,122

(22) Filed: Mar. 3, 2004

(65) Prior Publication Data

US 2005/0198057 A1    Sep. 8, 2005

(51) Int. Cl.
G06F 7/00 (2006.01)
G06F 17/00 (2006.01)

(52) U.S. Cl. .................................................... 707/102
(58) Field of Classification Search ............... 707/102
See application file for complete search history.

(56) References Cited

U.S. PATENT DOCUMENTS 6,134,559 A * 10/2000 Brumme et al. ......... 707/103 R
6,851,105 B1 * 2/2005 Coad et al. .................. 717/106
2002/0087557 A1 * 7/2002 Wall et al. ..................... 707/10
2002/0165995 A1 * 11/2002 Matula et al. ............... 709/316
2003/0163479 A1 * 8/2003 Mathews et al. ............ 707/102

OTHER PUBLICATIONS

Bill Brogden, Marcus Green; Java 2 Programmer Exam Cram 2; Published Mar. 7, 2003 Chapter 5 Section 2, 2 pages.*

* cited by examiner

Primary Examiner—John E Breene
Assistant Examiner—Alex Gofman
(74) Attorney, Agent, or Firm—Workman Nydegger

(57) ABSTRACT

A data structure and method for defining and manipulating object model attributes within a meta-model is provided. The data structure may include a model element class which functions as a base class for storage of attribute values. A model element field handler object provides accessing and setting of the attribute values stored in the model element class.

12 Claims, 6 Drawing Sheets

```
                        600
                           ╲ private int age;
        public int Age        602
{
        get
    {
                return age;         604
    }
        set
    {
modelElementAgeFieldHanlder.SetFieldValue(this, value);
    }
}
                                    606
```

Figure 6

MECHANISM FOR EFFICIENTLY IMPLEMENTING OBJECT MODEL ATTRIBUTES

FIELD OF THE INVENTION

Aspects of the present invention relate generally to data structures and object-oriented computer programming. More specifically, aspects of the present invention provide a data structure that defines and manipulates object model attributes within a meta-model.

BACKGROUND

Meta-models contain information such as rules and constructs and are commonly used to describe a tool, application, data structure, or system. For instance, when modeling a database application, one level of the database may describe the tables that will be utilized in the database application. At another level, the columns and rows, along with the data type may also be described in the database model application.

One drawback of current meta-models is that large amounts of memory overhead and computer processing time are required to store, find, and manipulate boxed attribute values within these models. The boxed attribute values may be stored in an array which further increases the amount of memory needed for storage. The additional memory requirement contributes to increased processing time.

Another drawback of the current meta-models is that code generated may be difficult to debug, as values such as the boxed attribute values typically end up deeply nested within wrapper classes. Additionally, the values of an object may be stored externally to the object itself adding to the complexity of debugging, as the values are not directly observable in a debugger application.

Yet another drawback of current meta-models is that complex calling conventions are required to support complicated features or tools, such as undo/redo and notifications which are implemented in many applications. These calling conventions complicate the code required to access or manipulate the boxed attribute values or the relationships between the elements.

Therefore, there is a need in the art, for a data structure and method that address each of the described drawbacks of current meta-models and efficiently implements object model attributes.

BRIEF SUMMARY

Aspects of the present invention address one or more of the issues mentioned above, thereby providing a data structure and method that separate storage of an attribute value from handling of the attribute value. The data structure allows for a very flexible and memory efficient manner in which to store, access, and set attribute values of a meta-model. The data structure of the present invention provides a model element class which functions as the base class for storage of attribute values. A model element field handler object provides accessing and setting of the attribute values stored in the model element class.

BRIEF DESCRIPTION OF THE DRAWINGS

Aspects of the present invention are described with respect to the accompanying figures, in which like reference numerals identify like elements, and in which:

FIG. 6 depicts a portion of exemplary code in accordance with an embodiment of the present invention for accessing and setting attribute values;

DETAILED DESCRIPTION

Exemplary Operating Environment

Figure 1:
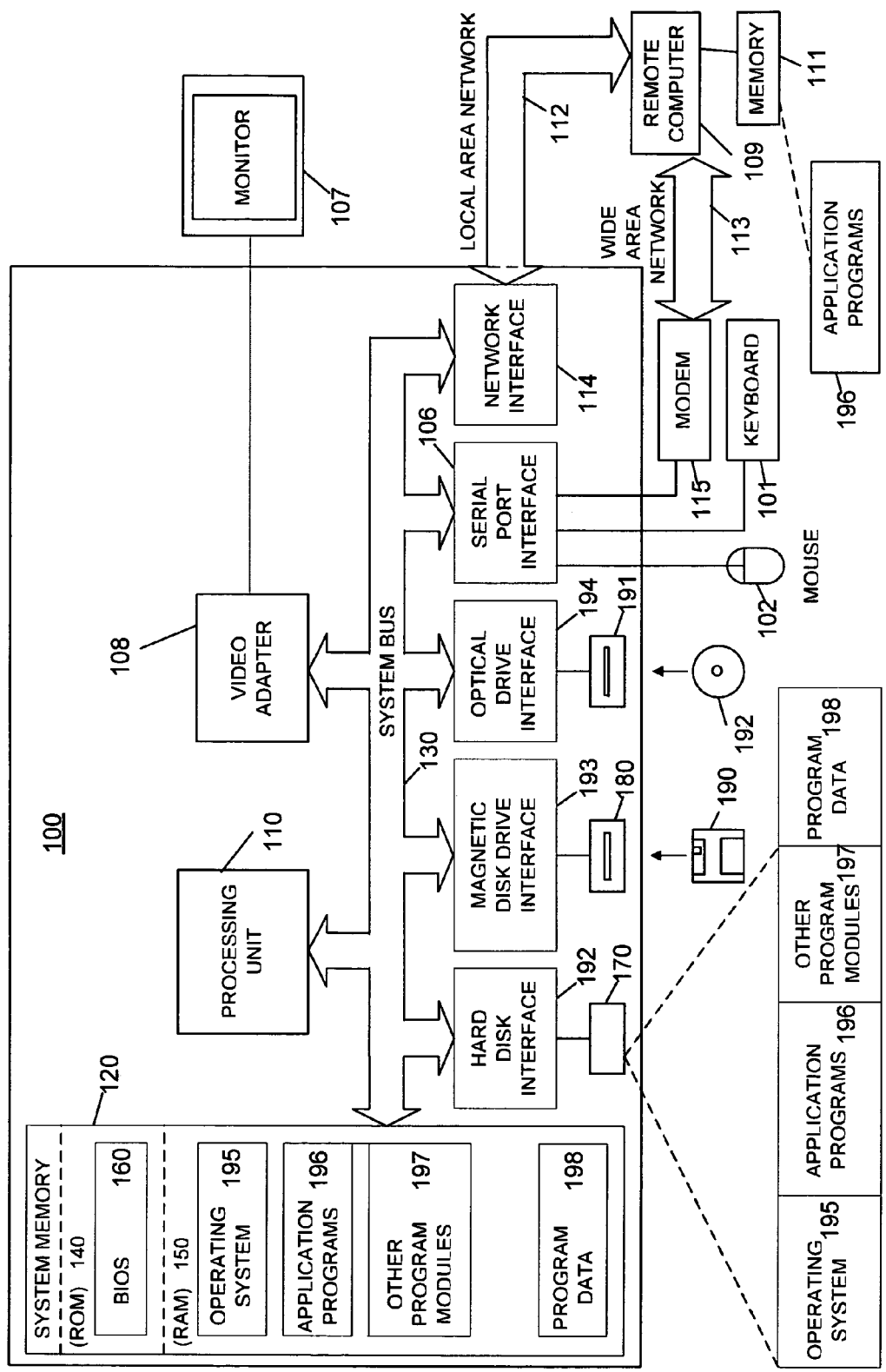
FIG. 1 shows a functional block diagram of a conventional general-purpose computer system that can be used to implement various aspects of the invention.

FIG. 1 is a functional block diagram of an example of a conventional, general-purpose, digital computing environment that can be used to efficiently implement object model attributes of a meta-model in accordance with various aspects of the present invention. In FIG. 1, a computer 100 includes a processing unit 110, a system memory 120, and a system bus 130 that couples various system components, including the system memory, to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used.

The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Description of Illustrative Embodiment

Figure 2:
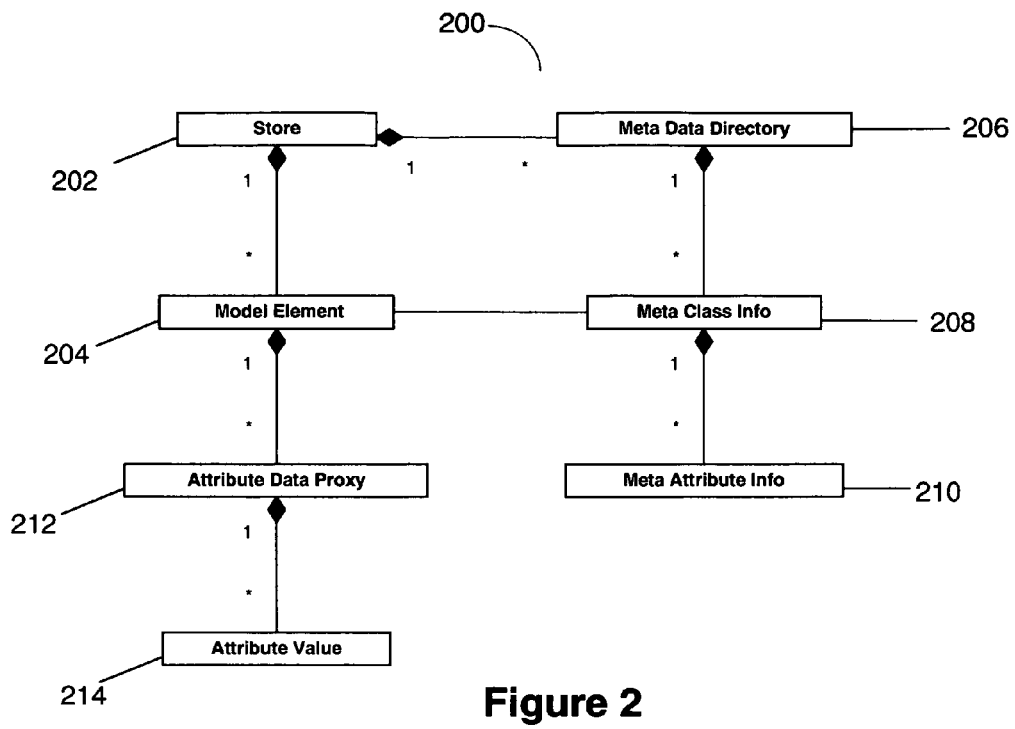
FIG. 2 depicts a unified modeling language diagram for attribute implementation in a generic system.

FIG. 2 illustrates a unified modeling language diagram 200 of a data structure for attribute implementation for a generic system that declares and binds fields to model elements. A store 202 is defined to hold all instances of the objects within a meta-model. The store 202, acting as container, holds model element 204 and meta-data used in the meta-model. The store 202 sits at the top of a tree structure. The store 202 may be an in-memory store allowing manipulation of objects' attributes and relationships.

Model element 204 is a base class for all of the data that is located in store 202. Model element 204 implements constructs as described by the meta-data. The meta-data contains information used to describe other data such as type, name, default values, or restrictions imposed on the data. An attribute data proxy 212, as shown in FIG. 2, stores a collection of attribute values 214.

As shown in FIG. 2, a meta-data directory 206 maintains all meta-objects within the store 202. The meta-objects may include a meta-class info object 208, a meta-attribute info object 210, and a meta-relationship info object (not shown). Meta-objects may be added to the meta-data directory 206 through an add method. The meta-data directory 206 also provides a find method which may be utilized by a user to locate a specific meta-object.

A meta-class information object 208, as shown in FIG. 2, holds meta-data for a meta-class. In particular, meta-class information object 208 is a subclass of model element 204 and holds meta-data for model element 204.

A meta-attribute information object 210, as shown in FIG. 2, describes attributes for a given model element 204. The meta-attribute information object 210 is associated with the meta-class information object 208. In terms of a database example, if a developer or user wants to construct a database, the developer or user would describe each level of the database. For example, the user or developer would construct, at a first level, various tables for use in the database. At another or second level, the developer or user would define the columns to be utilized in each of the tables. Similar to the database example, a developer or user may construct, as a first level, the meta-class information object 208 which holds the meta-data for a meta-class. At another or second level, a developer or user may define the meta-attribute information object 210 similar to the columns in the database example.

Figure 3:
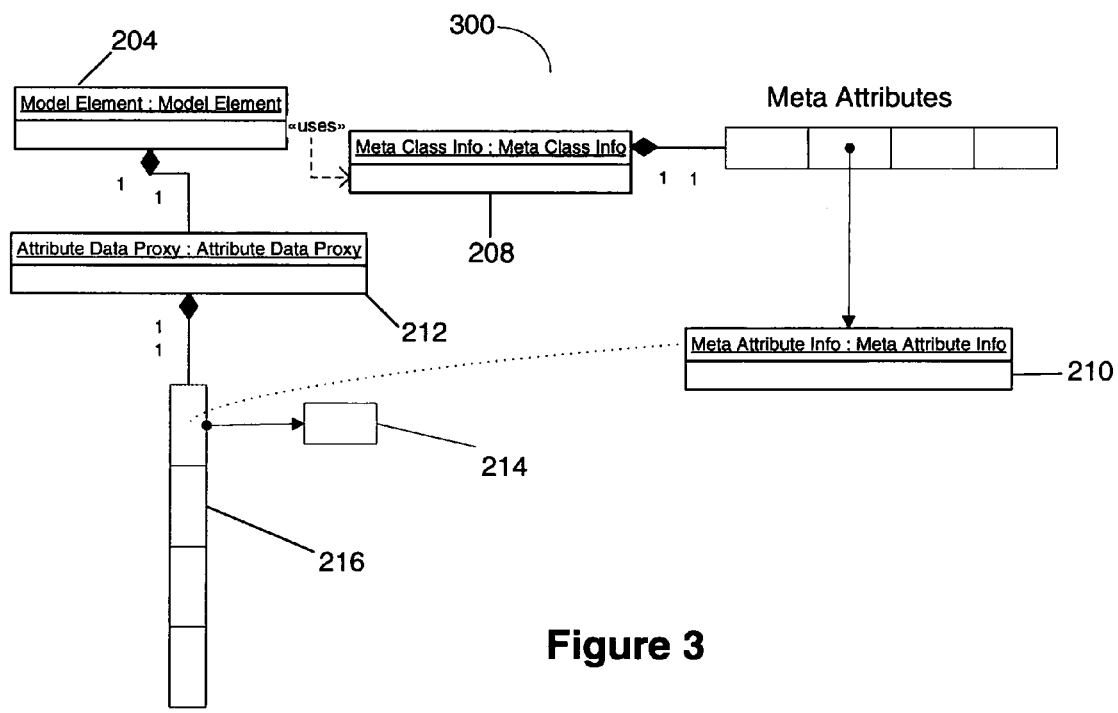
FIG. 3 depicts a physical implementation of FIG. 2 for attribute implementation in a generic system.

FIG. 3 depicts the physical implementation 300 of a generic system for declaring and binding fields to model elements as described above in FIG. 2. As illustrated in FIG. 3, an array 216 stores boxed attribute values 214 and object references. The array 216 is stored in attribute data proxy object 212.

Figure 4:
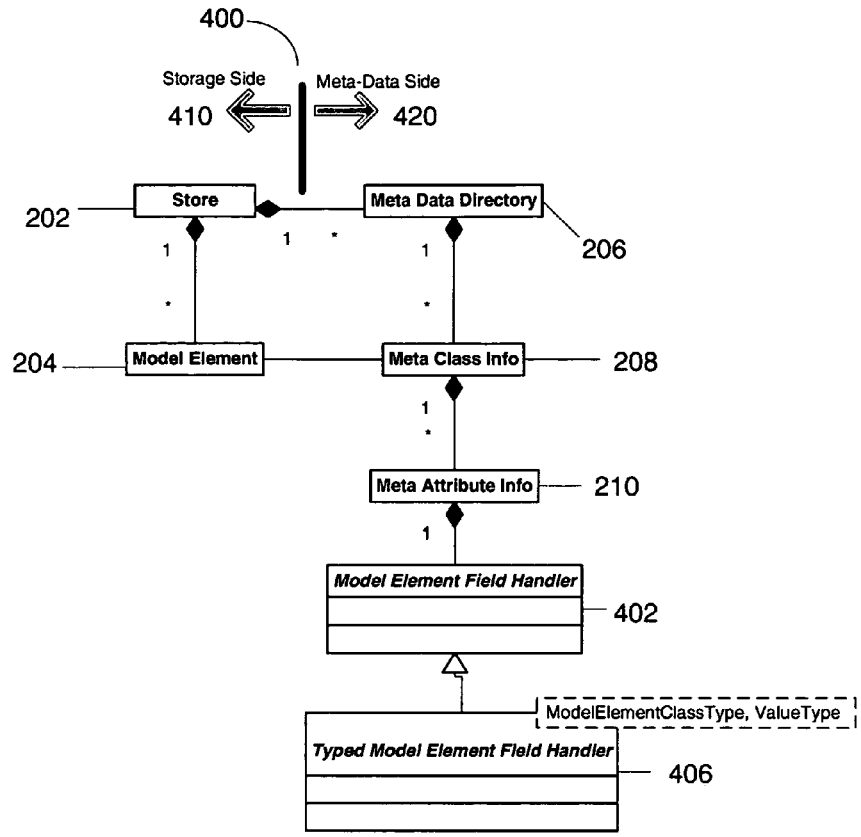
FIG. 4 depicts a unified modeling language diagram of an attribute implementation for declaring and binding fields to model elements in accordance with an embodiment of the present invention.
Figure 5:
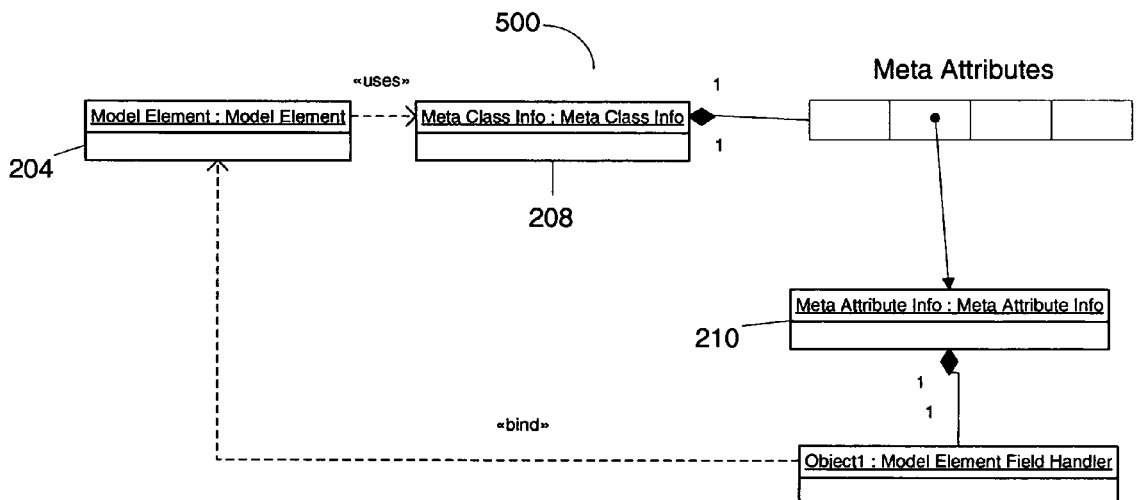
FIG. 5 depicts a physical implementation of FIG. 4 in accordance with an embodiment of the present invention.

FIG. 4 depicts a unified modeling language diagram 400 in accordance with an embodiment of the present invention, whereas FIG. 5 illustrates a physical implementation 500 of FIG. 4.

As illustrated in FIG. 4, the physical storage of attribute values 410 has been separated from the handling of the attribute values 420. The attribute data proxy 212 (FIG. 2) has been replaced by inlined field values located in model element 204. The inlined field values of the present invention are located in the same memory block as the declaring class. The use of inlined field values does not require the meta-model to perform multiple memory allocations to hold the boxed field values 214, the attribute data proxy 212, and the array of object references 216. In addition, the attribute values are not wrapped. The use of the inlined field values, therefore, reduces memory overhead such as storage of virtual memory pointers and increases CPU performance. In addition, as the attribute values are stored directly in model element 204, search times are eliminated and debugging may be simplified as the location of the attribute values is known.

The meta-attribute information object 210 may be expanded to include a reference to a singleton model element field handler object 402. The singleton model element field handler 402 provides for the accessing and setting of the attribute values in the model element 204. The singleton model element field handler object 402 is an abstract base class for handling the inlined field values of model element 204. Base field handler classes act as an intermediary generic mechanism when accessing or setting a field value in the model element object. The singleton pattern enables the data structure to instantiate only one instance of a particular object, and that instance is used to supply functionality for any other client that wishes to call that one instance. A first subclass of the singleton model field handler object 402 is a typed model element field handler object 406. The typed model field handler object 406 is an abstract class that implements all methods defined as abstract in the singleton model element field handler 402.

In most programming languages, access to a class can be designated as public or private. For example in C++, a public keyword specifies that those members of the class are accessible from any function. Similarly in C++, a private keyword specifies that those members of the class are accessible only from member functions and friends of the class.

A nested class is a class that is fully enclosed within another class declaration. The access level of the nested class is implicitly at least the level of the enclosing class. In Microsoft®.NET, nested classes have public access to its parent or nesting classes. This capability enables an attribute value to be placed in a private field inside of the model element 204. A nested handler class may then be declared. Because the nested class inherits base functionality from a generic handler class, the nested handler will have access to the enclosing element's private members. For each field that is defined in the model element 204, we have a new subclass that is nested within the model element 402. This nesting within the model element 204 gives the subclass public access to that model element's field data. This enables a function such as a get function to access the model element and return the attribute value directly upon request. For example, a GetValue( ) method would may be responsible for dispatching to the subclassed GetFieldValue( ) method, which directly return the value stored in the Model Element.

FIG. 6 depicts a portion of exemplary code 600 in accordance with an embodiment of the present invention for accessing and setting attribute values for a meta-model that defines a person object having an age field. Those skilled in the art will realize that there are many factors about a person that a developer or user may want to keep track of such as weight or eye color within the meta-model. The use of age is just one example to illustrate the invention. The age of the person may have an attribute value representing the actual age of the person.

Referring to FIG. 6, a get function 602 is generated. The get function returns the age of the person of interest directly. There is no searching as the field values are all inlined into the elements. To set the age value, a set function 604 through the use of the singleton model field handler sets the attribute value in the model element. The SetValue( ) method provides analogous access as GetValue( ), but also is responsible for providing validation of the new value, records necessary undo information with an undo system, and dispatches to the subclassed SetFieldValue( ) call, which records the actual change value into the model element. Because the implementation of the model element FieldHanlder.SetFieldValue 606 is a nested class, it may directly access data in the element as the handler has public access to the private members of the model element. Thus, the invention provides an efficient method for accessing and setting an attribute value.

Figure 7:
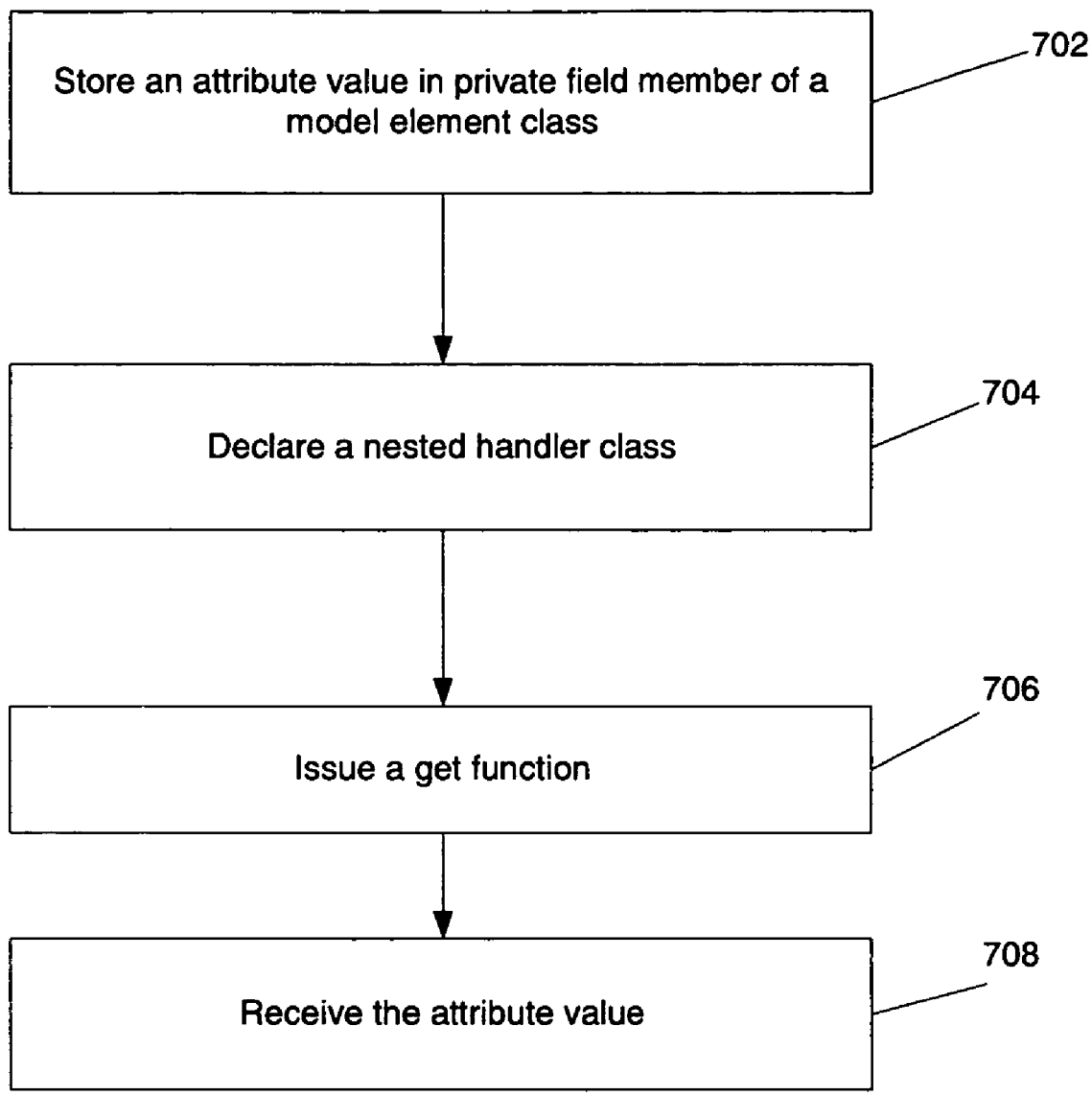
FIG. 7 illustrates a method of accessing an attribute value in accordance with an embodiment of the present invention.

FIG. 7 illustrates a method of accessing an attribute value in accordance with an embodiment of the present invention. In a first step 702, an attribute value is stored in a private field member of a model element class 204. In step 704, a nested handler class is declared. The nested handler class may directly access data in the element as the handler has public access to the private members of the model element. In step 706, a get function is issued to retrieve an attribute value. In step 708, the attribute value is received.

Figure 8:
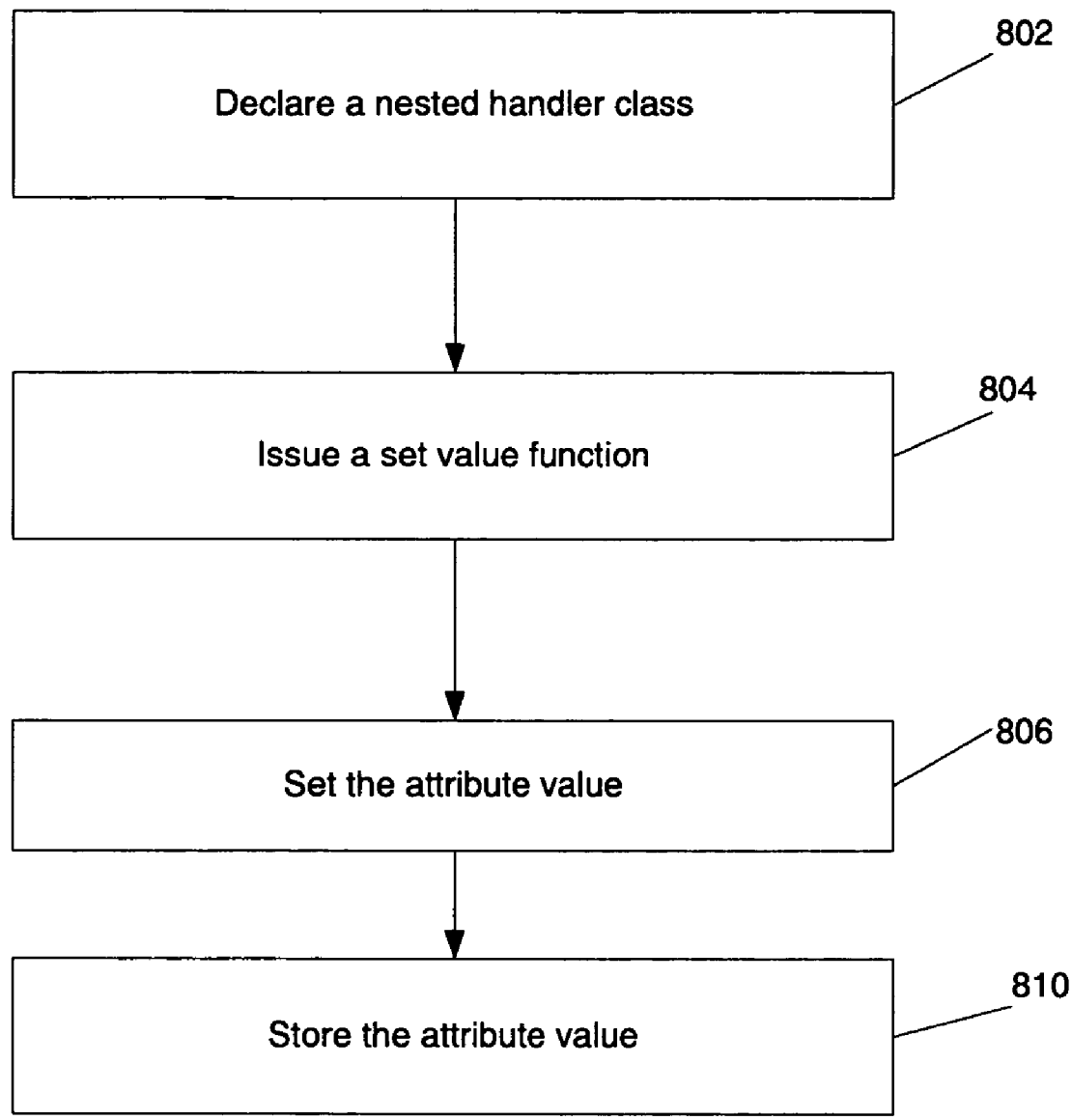
FIG. 8 illustrates a method of setting an attribute value in accordance with an embodiment of the present invention.

FIG. 8 illustrates a method of setting an attribute value in accordance with an embodiment of the present invention. In a first step 802, a nested handler class is declared. A set value function is issued in step 804. The set function instructs the singleton model element field handler object 402 to set the attribute value. The attribute value is set in step 806 and stored in the model element in step 810.

The present invention has been described in terms of preferred and exemplary embodiments thereof. Numerous other embodiments, modifications and variations within the scope and spirit of the appended claims will occur to persons of ordinary skill in the art from a review of this disclosure.

Attached is exemplary code disclosing methods for the Model Element Field Handler:

```
#region ModelElementFieldHandler
/// <summary>
/// Abstract base class for defining field handlers
/// </summary>
abstract public class ModelElementFieldHandler
{
    /// <summary>
    /// Constructor
    /// </summary>
    protected ModelElementFieldHandler( ) { }
    /// <summary>
    /// CLSCompliant version of GetValue. Must be overridden
    /// </summary>
    /// <param name="element">the element that contains the
    /// value</param>
    /// <returns>the value</returns>
    abstract public object GetValueAsObject(ModelElement element);
    /// <summary>
    /// CLSCompliant set value method to use objects instead of
    /// templates. must be overridden
    /// </summary>
    /// <param name="element">the model element</param>
    /// <param name="value">the value</param>
    abstract public void SetValueAsObject(ModelElement element,
                                          object value);
    /// <summary>
    /// returns the MetaAttributeInfo for this field handler
    /// </summary>
    /// <param name="element">the element</param>
    /// <returns>MetaAttributeInfo</returns>
    protected MetaAttributeInfo GetMetaAttributeInfo(
            ModelElement element);
    /// <summary>
    /// Gets the Attribute Id for this field
    /// </summary>
    /// <value>Guid</value>
    abstract public Guid Id{get;}
    /// <summary>
    /// Get the type of the Value in this undo record
    /// </summary>
    /// <value>Type</value>
    abstract public Type ValueType { get; }
    /// <summary>
    /// Get the type of the element in this undo record
    /// </summary>
    /// <value>Type</value>
    abstract public Type ElementType { get; }
}
```

Attached is exemplary code for the Typed Model Field Handler:

```
#region TypedModelElementFieldHandler<FieldType,
ElementClassType>
/// <summary>
/// Base templated class for handling field information
/// </summary>
[CLSCompliant(false)]
abstract public class
TypedModelElementFieldHandler<ElementClassType,
                FieldType> : ModelElementFieldHandler
```

-continued

```
where ElementClassType : ModelElement
{
    /// <summary>
    /// Constructor
    /// </summary>
    protected TypedModelElementFieldHandler( ) : base( ) { }
    /// <summary>
    /// Default overrideable validator.
    /// </summary>
    /// <param name="newValue">the new value to test</param>
    /// <returns>true by default</returns>
    public virtual bool IsValidValue(ElementClassType element,
                        FieldType newValue);
    /// <summary>
    /// Returns the default value for the field.
    /// This is overrideable, but by definition is set to return
    /// FieldType.default
    /// </summary>
    /// <param name="element">the element</param>
    /// <returns>the default value</returns>
    public virtual FieldType DefaultValue(ElementClassType
        element)
    {
        return FieldType.default;
    }
    /// <summary>
    /// CLSCompliant version of GetValue
    /// </summary>
    /// <param name="element">the element that contains the
    /// value</param>
    /// <returns>the value</returns>
    public override sealed object GetValueAsObject(
            ModelElement element);
    /// <summary>
    /// CLSCompliant set value method to use objects instead of
    /// templates
    /// </summary>
    /// <param name="element">the model element</param>
    /// <param name="value">the value</param>
    public override sealed void SetValueAsObject(
            ModelElement element, object value);
    /// <summary>
    /// Set the field's value
    /// </summary>
    /// <param name="element">the element</param>
    /// <param name="value">the new value for the field</param>
    [CLSCompliant(false)]
    public void SetFieldValue(ElementClassType element,
                    FieldType value);
    /// <summary>
    /// Get the field's value
    /// </summary>
    /// <param name="element">the element</param>
    /// <returns>the value</returns>
    [CLSCompliant(false)]
    public FieldType GetFieldValue (ElementClassType element);
    /// <summary>
    /// Get the type of the Value in this undo record
    /// </summary>
    /// <value>Type</value>
    public sealed override Type ValueType { get; }
    /// <summary>
    /// Get the Type of the element in this undo record
    /// </summary>
    /// <value>Type</value>
    public sealed override Type ElementType { get; }
    /// <summary>
    /// Abstract method that actually sets the value in the element
    /// </summary>
    /// <param name="element">the element</param>
    /// <param name="value">the new value</param>
    [CLSCompliant(false)]
    protected abstract void SetValue(ElementClassType element,
                    FieldType value);
    /// <summary>
    /// Abstract method that actually gets the value from the element
    /// </summary>
    /// <param name="element">the element</param>
    /// <returns>the value</returns>
```

```
    [CLSCompliant(false)]
    protected abstract FieldType GetValue(ElementClassType element);
    /// <summary>
    /// Kick off the Notification that the value has changed
    /// </summary>
    /// <param name="element">the element whose value has
    /// changed</param>
    /// <param name="metaAttributeInfo">the metadata for the
    /// attribute</param>
    /// <param name="oldValue">the old value before it
    /// changed</param>
    private void ValueChanged(ElementClassType element,
                        MetaAttributeInfo metaAttributeInfo,
                        FieldType oldValue);
}
#endregion
```

Attached is exemplary code for the Typed Model Element Pass Thru Field Handler:

```
#region TypededModelElementPassthruFieldHandler<FieldType,
        ElementClassType>
/// <summary>
/// Base template class for handling field information
/// </summary>
[CLSCompliant(false)]
abstract public class
TypededModelElementPassthruFieldHandler<ElementClassType,
FieldType> :
    ModelElementFieldHandler
    where ElementClassType : ModelElement
{
    /// <summary>
    /// Constructor
    /// </summary>
    protected TypededModelElementPassthruFieldHandler( ) : base( ) { }
    /// <summary>
    /// Default overrideable validator.
    /// </summary>
    /// <param name="newValue">the new value to test</param>
    /// <returns>true by default</returns>
    public virtual bool IsValidValue(ElementClassType element,
                        FieldType newValue);
    /// <summary>
    /// Returns the default value for the field.
    /// This is overrideable, but by definition is set to return
    /// FieldType.default
    /// </summary>
    /// <param name="element">the element</param>
    /// <returns>the default value</returns>
    public virtual FieldType DefaultValue(ElementClassType element);
    /// <summary>
    /// CLSCompliant version of GetValue
    /// </summary>
    /// <param name="element">the element that contains the
    /// value</param>
    /// <returns>the value</returns>
    public override sealed object GetValueAsObject(
                        ModelElement element);
    /// <summary>
    /// CLSCompliant set value method to use objects instead of
    /// templates
    /// </summary>
    /// <param name="element">the model element</param>
    /// <param name="value">the value</param>
    public override sealed void SetValueAsObject(
                        ModelElement element,
                        object value);
    private bool FindRealElementAndAttribute(
                        ElementClassType element,
                        out ModelElement realElement,
                        out MetaAttributeInfo realAttribute);
    /// <summary>
    /// Abstract method that actually sets the value in the element
    /// </summary>
```

-continued

```
/// <param name="element">the element</param>
/// <param name="value">the new value</param>
[CLSCompliant(false)]
protected void SetValue(ElementClassType element,
                FieldType value);
/// <summary>
/// Abstract method that actually gets the value from the element
/// </summary>
/// <param name="element">the element</param>
/// <returns>the value</returns>
[CLSCompliant(false)]
protected FieldType GetValue(ElementClassType element);
/// <summary>
/// Set the field's value. This method is responsible for
/// providing notification and undo/redo processing. It then
/// calls SetValue( ) to physically set the value into the field.
/// </summary>
/// <param name="element">the element</param>
/// <param name="value">the new value for the field</param>
[CLSCompliant(false)]
public void SetFieldValue(ElementClassType element,
                FieldType value);
/// <summary>
/// Get the field's value
/// </summary>
/// <param name="element">the element</param>
/// <returns>the value</returns>
[CLSCompliant(false)]
public FieldType GetFieldValue(ElementClassType element);
/// <summary>
/// Kick off the Notification that the value has changed
/// </summary>
/// <param name="element">the element whose value has
/// changed</param>
/// <param name="metaAttributeInfo">the metadata for the
/// attribute</param>
/// <param name="oldValue">the old value before it
/// changed</param>
private void ValueChanged(ElementClassType element,
            MetaAttributeInfo metaAttributeInfo,
            FieldType oldValue);
/// <summary>
/// Get the type of the Value in this undo record
/// </summary>
/// <value>Type</value>
public sealed override Type ValueType { get; }
/// <summary>
/// Get the Type of the element in this undo record
/// </summary>
/// <value>Type</value>
public sealed override Type ElementType { get; }
}
#endregion
```

I claim:

1. A computer-readable storage medium having stored thereon a data structure, the data structure separating storage of an attribute value from handling of the attribute value, comprising:
   a) a model element class configured to implement the constructs described by metadata; the model element class storing an attribute value directly in a private member field of the model element class in a memory block where a declaring class is stored;
   b) a declared nested handler class, wherein the nested handler class is a subclass of a generic handler class and inherits base functionality from the generic handler class, wherein the nested handler class has public access to an enclosing element's private members stored in the private member field of the model element class;
   c) a meta-attribute information object configured to describe attributes of the model element class;
   d) a singleton model element field handler object comprising a singleton pattern as an abstract base class for handling inlined field values of the model element class configured to access the attribute value stored in the model element class, wherein a first subclass of the singleton model element field handler object comprises a typed model element field handler subclass defining a get value function;
   e) a base field handler class which acts as an intermediary generic mechanism when getting the field values in the model element field handler object, wherein the get value function is configured to:
      i) dispatch the field values to a first sub-classed get field value method in the first subclass;
      ii) access the model element class and return the attribute value stored in the private member field of the model element class directly upon request; and
      iii) provide an entry point for other sub-classed get field value method representing a plurality of types so that general purpose client code can access the field values irrespective of the type of the first sub-classed get field value; and
   wherein the storage of the attribute value is separate from handling of the attribute value.

2. The computer-readable medium of claim 1, wherein the model element field handler object sets the attribute value sorted in the model element class.

3. The computer-readable medium of claim 1, wherein the typed model element field handler subclass defines a set value function for setting the attribute value.

4. The computer-readable medium of claim 1, wherein the data structure further comprises
   d) a meta-class information object for storing data associated with the model element.

5. The computer-readable medium of claim 1, wherein the singleton pattern enables the data structure to instantiate only one instance of a particular object which is used for supplying functionality for other users who wish to call that one instance.

6. A computer-readable storage medium having stored thereon a data structure, the data structure separating storage of an attribute value from handling of the attribute value, comprising:
   a) a container for storing meta-data in a tree structure;
   b) a model element class configured to implement the constructs described by metadata; the model element class storing an attribute value directly in a private member field of the model element class in a memory block where a declaring class is stored;
   c) a declared nested handler class, wherein the nested handler class is a subclass of a generic handler class and inherits base functionality from the generic handler class, wherein the nested handler class has public access to an enclosing element's private members stored in the private member field of the model element class;
   d) a meta-class information object configured to store data associated with the model element;
   e) a meta-attribute information object configured to describe attributes of the model element class;
   f) a singleton model element field handler object comprising a singleton pattern as an abstract base class for handling inlined field values of the model element class configured to access the attribute value stored in the model element class, wherein a first subclass of the model element field handler object comprises a typed model element field handler subclass defining a set value function for setting the attribute value;
   g) a base field handler class which acts as an intermediary generic mechanism when setting the field values in the model element field handler object, wherein the set value function is configured to:
  i) provide validation of a new value; and
  ii) record necessary undo information associated with the new value;
  iii) dispatch the field values to a first sub-classed set field value method in the first subclass;
  iv) access the model element class and return the attribute value stored in the private member field of the model element class directly upon request; and
  v) provide an entry point for other sub-classed set field value method representing a plurality of types so that general purpose client code can access the field values irrespective of the type of the first sub-classed set value;
wherein the nested handler class is configured to directly access data in the model element class as the nested handler class has public access to the private members of the model element class; and
wherein the storage of the attribute value is separate from handling of the attribute value.

7. The computer-readable medium of claim 6, wherein the container comprises a store acting as a root of the tree structure.

8. The computer-readable medium of claim 6, wherein the model element field handler object sets the attribute value stored in the model element class.

9. The computer-readable medium of claim 6, wherein the typed model element field handler subclass defines a get value function for accessing the attribute value.

10. The computer-readable medium of claim 6, wherein the singleton pattern enables the data structure to instantiate only one instance of a particular object which is used for supplying functionality for other users who wish to call that one instance.

11. A method implemented at least in part by a computing device, the computing device accessing an attribute value within a data structure, the data structure separating storage of the attribute value from handling of the attribute value, the method comprising:
  a) storing the attribute value in a private member field of a model element class in a memory block where a declaring class is stored;
  b) declaring a nested handler class, the nested handler class being a subclass of a generic handler class and inherits base functionality from the generic handler class, wherein the nested handler class has public access to an enclosing element's private members stored in the private member field of the model element class;
  c) providing a singleton model element field handler object comprising a singleton pattern as an abstract base class for handling inlined field values of the model element class configured to access the attribute value stored in the model element class, wherein a first subclass of the singleton model element field handler object comprises a typed model element field handler subclass defining a get value function;
  d) issuing the get value function to obtain the attribute value from the model element class; and
  e) receiving the attribute value from the model element class;
  f) providing a base field handler class which acts as an intermediary generic mechanism when getting the field values in the model element field handler object, wherein the get value function is configured to:
    i) dispatch to a sub-classed get field value method in the first subclass;
    ii) access the model element class and return the attribute value stored in the private member field of the model element class directly upon request; and
    iii) provide an entry point for other sub-classed get field value method representing a plurality of types so that general purpose client code can access the field values irrespective of the type of the first sub-classed get field; and
wherein the storage of the attribute value is separate from handling of the attribute value.

12. A method implemented at least in part by a computing device, the computing device setting an attribute value within a data structure, the data structure separating storage of the attribute value from handling of the attribute value, the method comprising:
  a) declaring a nested handler class, the nested handler class being a subclass of a generic handler class and inherits base functionality from the generic handler class, wherein the nested handler class has public access to an enclosing element's private members stored in the private member field of the model element class;
  b) providing a singleton model element field handler object comprising a singleton pattern as an abstract base class for handling inlined field values of the model element class configured to access the attribute value stored in the model element class, wherein a first subclass of the model element field handler object comprises a typed model element field handler subclass defining a set value function for setting the attribute value;
  c) issuing the set value function to set the attribute value for the model element class;
  d) setting the attribute value;
  e) storing the attribute value in a private member field of the model element class in a memory block where a declaring class is stored;
  f) providing a base field handler class which acts as an intermediary generic mechanism when setting the field values in the model element field handler object, wherein the set value function is configured to:
    i) provide validation of a new value;
    ii) record necessary undo information associated with the new value; and
    iii) dispatch the field values to a first sub-classed set field value method in the first subclass;
    iv) access the model element class and return the attribute value stored in the private member field of the model element class directly upon request; and
    v) provide an entry point for other sub-classed set field value method representing a plurality of types so that general purpose client code can access the field values irrespective of the type of the first sub-classed set value;
wherein the nested handler class is configured to directly access data in the model element class as the nested handler class has public access to the private members of the model element class; and
wherein the storage of the attribute value is separate from handling of the attribute value.

* * * * *

UNITED STATES PATENT AND TRADEMARK OFFICE
CERTIFICATE OF CORRECTION

| | | |
|---|---|---|
| PATENT NO. | : 7,613,718 B2 | Page 1 of 1 |
| APPLICATION NO. | : 10/792122 | |
| DATED | : November 3, 2009 | |
| INVENTOR(S) | : Steven T. Antoch | |

It is certified that error appears in the above-identified patent and that said Letters Patent is hereby corrected as shown below:

In column 12, line 12, in Claim 11, delete "field;" and insert -- field value; --, therefor.

Signed and Sealed this

Fifteenth Day of February, 2011

David J. Kappos
*Director of the United States Patent and Trademark Office*